(12) United States Patent
Allen, Jr. et al.

(10) Patent No.: US 8,464,326 B2
(45) Date of Patent: Jun. 11, 2013

(54) ACCESSING MATERIALS VIA VOICE AND A MENU

(75) Inventors: Lloyd W. Allen, Jr., Cary, NC (US); Jana H. Jenkins, Raleigh, NC (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 12/404,394

(22) Filed: Mar. 16, 2009

(65) Prior Publication Data
US 2010/0235894 A1 Sep. 16, 2010

(51) Int. Cl.
*G06F 21/00* (2006.01)

(52) U.S. Cl.
USPC ........ 726/7; 726/2; 726/21; 726/27; 713/155; 713/156; 713/157; 713/158; 713/159; 380/247; 380/248; 380/249; 380/250

(58) Field of Classification Search
USPC . 726/7, 726/2–21, 27; 380/247–250; 340/5.8, 340/5.86; 707/705; 709/225; 713/155–159
See application file for complete search history.

(56) References Cited

U.S. PATENT DOCUMENTS

| | | | |
|---|---|---|---|
| 6,417,933 B1* | 7/2002 | Szurkowski | 358/442 |
| 7,343,008 B1* | 3/2008 | Frankel | 379/202.01 |
| 2003/0158900 A1* | 8/2003 | Santos | 709/205 |
| 2004/0099731 A1* | 5/2004 | Olenick et al. | 235/380 |
| 2004/0141005 A1* | 7/2004 | Banatwala et al. | 345/751 |
| 2004/0141605 A1* | 7/2004 | Chen et al. | 379/202.01 |
| 2005/0152523 A1* | 7/2005 | Fellenstein et al. | 379/202.01 |
| 2007/0206759 A1* | 9/2007 | Boyanovsky | 379/202.01 |
| 2008/0219426 A1* | 9/2008 | Lai | 379/202.01 |
| 2010/0070640 A1* | 3/2010 | Allen et al. | 709/229 |

* cited by examiner

*Primary Examiner* — Andy Rao
*Assistant Examiner* — Shan Elahi
(74) *Attorney, Agent, or Firm* — Charles L. Moore; Moore & Van Allen PLLC (57) ABSTRACT

A computer implemented method for accessing materials for a meeting may include receiving a call from a meeting participant by a system, wherein the meeting participant calls a prearranged teleconference number to participate in the meeting. The method may also include validating participation of the meeting participant in the meeting by the system. The method may further include providing access to an appropriate set of materials to the meeting participant based on a predetermined attribute associated with the meeting participant.

17 Claims, 6 Drawing Sheets

ACCESSING MATERIALS VIA VOICE AND A MENU

CROSS-REFERENCE TO RELATED APPLICATIONS

The present application is related to U.S. patent application Ser. No. 12/210,677, filed Sep. 15, 2008, entitled "Method and System for Allowing Access to Presentation Materials for a Meeting," which is assigned to the assignee as the present application and is incorporated herein in its entirety by reference.

BACKGROUND

The present invention relates to teleconferencing or meetings between individuals at remote locations, and more particularly to allowing access to presentation materials for a meeting.

Often times when a meeting or conference call is being organized, the meeting chair or organizer may have a selected invitee or participant list or multiple different invitee or participant lists. This list or lists may also constitute a distribution list or lists for presentation materials that may be available before or at the time of the meeting. There may also be different sets of materials for different distributions lists of meeting participants or invitees. Additional, supplemental or revised materials may also only be available at the time of the meeting. Depending upon the type of conference call, some participants may receive meeting information from a different source than the original meeting chair or organizer. For example, someone from the original invitee or participant list may forward the meeting invitation to one of their colleagues or members of the same team or organization, or the meeting invitation may be forwarded to a particular group of individuals who are not on the original list. This situation may result in potential issues and effective participation in the meeting or conference call because not all of the meeting participants joining the conference call will have access to or know where to go on a network or other arrangement to acquire any presentation materials or other information. Further, different sets of materials may be designated or authorized for delivery or access by certain groups of participants or invitees. The presentation materials or information for accessing the presentation materials may only be sent to the original invitees or participants or only these individuals may be provided authorization to access the materials. The "extended" or additional participants not on the original list may then need to interrupt the conference call to determine how they can access or acquire the presentation materials. There may also be participants that join the meeting or call late and do not know how to access the materials at the time of the call which may result in interruptions of the meeting. There may also be times when it is desirable to determine who is participating on the call, for example if the participant joins late, he may not know who else is on the call if introductions were made at the beginning. There may also be a need to know which invitees are not present on the teleconference.

SUMMARY

In accordance with an aspect of the present invention, a computer implemented method for accessing materials for a meeting may include receiving a call from a meeting participant by a system or server, wherein the meeting participant calls a prearranged teleconference number to participate in the meeting. The method may also include validating the meeting participant by the system for participation in the meeting. The method may further include providing access to an appropriate set of materials to the meeting participant based on a predetermined attribute associated with the meeting participant.

In accordance with another aspect of the present invention, a system for accessing materials for a meeting may include a system for receiving a call from a meeting participant, wherein the meeting participant calls a prearranged teleconference number to participate in the meeting. The system may also include a module for validating the meeting participant for participation in the meeting and a module for providing access to an appropriate set of materials to the meeting participant based on a predetermined attribute associated with the meeting participant. A database may store a set of materials for access by the meeting participant.

In accordance with a further aspect of the present invention, a computer readable storage medium includes computer usable program code embodied therewith for accessing materials for a meeting. The computer readable storage medium may include computer usable program code configured to receive a call from a meeting participant by a system, wherein the meeting participant calls a prearranged teleconference number to participate in the meeting. The computer readable storage medium may also include computer usable program code configured to validate participation of the meeting participant in the meeting by the system. The computer readable storage medium may also include computer usable program code configured to provide access to an appropriate set of materials to the meeting participant based on a predetermined attribute associated with the meeting participant.

Other aspects and features of the present invention, as defined solely by the claims, will become apparent to those ordinarily skilled in the art upon review of the following non-limited detailed description of the invention in conjunction with the accompanying figures.

DETAILED DESCRIPTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable storage medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could be any suitable medium upon which the program may be stored or electronically captured and then compiled, interpreted, or otherwise processed in a suitable manner. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate means, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
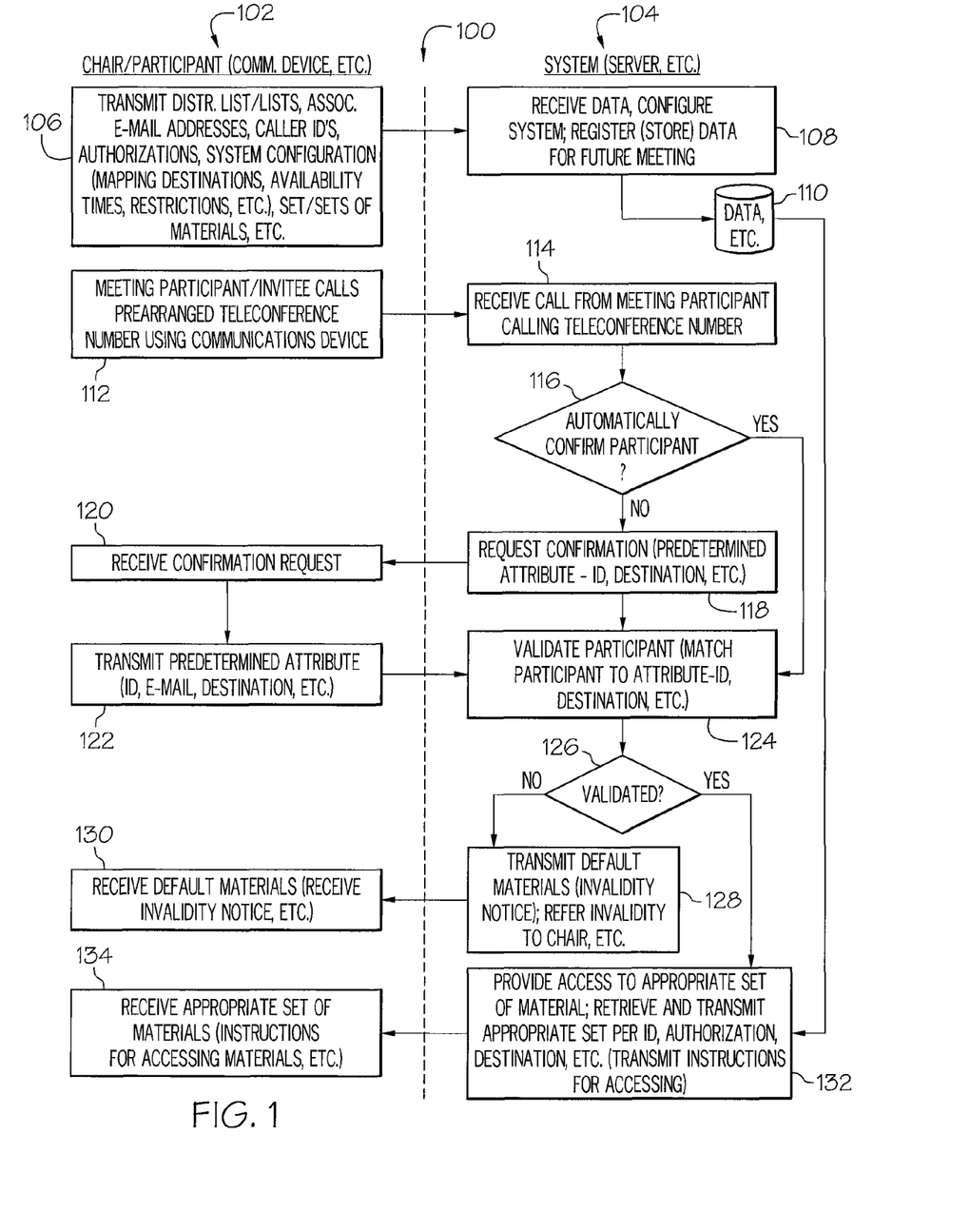
FIG. 1 is a flow chart of an example of a method for accessing materials in accordance with an embodiment of the present invention.

FIG. 1 is a flow chart of an example of a method 100 for accessing materials in accordance with an embodiment of the present invention. The method 100 may include participant or chair operations or functions that may be performed by a user's or meeting participant's communications device 102 and functions 104 that may be performed by a system or server, such as a meeting or teleconferencing system or server. As described in more detail with reference to FIG. 5, the participant's or chair's communications device may be a cellular phone, a personal digital assistant (PDA) with wireless capability, a laptop computer, handheld device, desk top computer, landline telephone, a combination of these devices or any type of communications device or devices that may permit a participant to participate in a conference call, online meeting or the like and to access and acquire materials associated with the meeting or conference call as described herein. The meeting or teleconference system may be a processor, server or other apparatus capable of performing the functions described herein.

In block 106, a distribution list of meeting participants or invitees or a plurality of lists of participants or invitees may be transmitted by a meeting chairman or chair to the system 104 using a communications device. An email address, caller identification (ID) or other attribute may be associated with each meeting participant and transmitted to the system 104. Any system configurations or settings may also be transmitted by the meeting chair to the system in block 106. Examples of system configuration or settings may include but is not limited to mapping destinations for delivery a set or sets of materials to meeting participants or different groups of meeting participants, setting times when materials may be available to participants or certain participants and other restrictions or rules on access to the materials, delivery of materials to meeting participants.

A set of materials or sets of materials may also be transmitted to the system 104 in block 106. Different sets of materials may be designated as being available for or accessible by only certain different distribution lists of meeting participants. Accordingly, each different set of materials may be associated with a different distribution list of meeting participants based on a selected criteria or attribute. Only those participants matching the criteria can have access to the selected set of materials. For example, meeting participants at one level of management or job function may have access to one set of materials and meeting participants at another level of management or job function may have access to another set of materials. Examples of the selected or preset criteria or predetermined attribute may be a pass code or access code, email address that matches a stored email address, a caller ID that matches a caller ID stores by the system or other similar criteria or attribute associated with the meeting participant or invitee.

In block 108, the data transmitted in block 106 by the communications device of the chair 102, including the distribution list or lists, sets of materials and any other data may be received by the system or server 104. The system may be configured based on any system configurations sent by the meeting chair. The data may be registered or stored in a database 110 for the meeting in the future.

In block 112, a meeting participant or invitee 102 may call a prearranged teleconference number using a communications device similar to that described herein. In block 114, the call from the meeting participant may be received by the meeting or teleconference system or server 104.

In block 116, a determination may be made if the meeting participant has been automatically confirmed as a valid or authorized participant by the system or server 104. This may be done by matching a predetermined attribute of the meeting participant to an attribute associated with the meeting participant stored by the system or server, such as an email address, caller ID or other identification of the meeting participant. If the meeting participant is confirmed as a valid meeting participant, the method 100 may advance to block 124. If the meeting participant is not automatically confirmed in block 116, the method 100 may advance to block 118. In block 118, a request may be transmitted to the meeting participant 102 requesting the predetermined attribute, such as an email address, caller ID, destination on a network for delivery of the materials or other attribute for validating the participant and/or delivery of the appropriate materials based on the predetermined attribute of the meeting participant.

In block 120, the meeting participant 102 receives the confirmation request. In block 122, the meeting participant 102 may transmit the predetermined attribute to the meeting or teleconference system or server 104. A caller ID or other identifier may be automatically transmitted to the system or server 104 by the participant's communications device in response to receipt of the confirmation request.

In block 124, participation in the meeting by the meeting participant may be validated. The participant may be validated by matching the participant's predetermined attribute to an attribute previously stored by the system similar to that discussed above.

In block 126, if the meeting participant is validated, the method 100 may advance to block 132, as described in more detail below. If the meeting participant is not validated in block 126, the method 100 may advance to block 128. In block 128, a default set of materials may be transmitted to the meeting participant 102. A notice of an invalid participant may also be sent to the meeting chair. As an alternative, or in addition to transmitting the default materials to the meeting participant 102, a message advising the meeting participant to contact the meeting chair may also be sent. In block 130, the meeting participant 102, may receive the default set of materials and the meeting chair may receive the invalidity notice.

In block 132, access to the appropriate set of materials may be provided to the validated meeting participant. In another embodiment, the appropriate set of materials may be retrieved and transmitted to the meeting participant based on the predetermined attribute associated with the meeting participant. For example, the appropriate set of materials may be sent based on the meeting participant's caller ID, may be sent to an email address of the participant, or may be sent to some other destination previously stored by the system 104. In a further embodiment, instructions for accessing the materials may be transmitted to the validated meeting participant.

In block 134, the meeting participant 102 may receive the appropriate set of materials or may receive instructions for accessing the set of materials.

In summary, the method 100 provides a method by which a meeting chair may register a distribution list or a set of distribution lists with associated email addresses, caller IDs or similar identifiers of meeting attendees or participants and a particular set of materials or sets of materials for each set or group of distribution lists. When a meeting participant 102 or invitee calls into the meeting or teleconference, meeting participant 102 may identify himself and confirm the associated destination for sending the materials with the system 104. The system server 104 may match the participant's name or other identification to the email address or ID. The system 104 may then send the appropriate or predefined set of materials to the validated and approved email address or caller ID of the identified caller or participant 102. The chair may restrict the attendee list depending on the confidentiality of the meeting as well as restrict locations or means by which the materials may be sent. For example, the chair may only configure the system to send the materials to an email address and not to a URL. The chair may also define days and times when each type of meeting material may be available to a specific distribution list. Accordingly, the embodiment of FIG. 1 permits different levels of information to be available for different groups of meeting attendees. Unauthenticated attendees may be permitted to access a default set of materials as provided by block 103. And certain meeting materials may only be available during certain allowed times to limit availability as previously described.

Figure 2A:
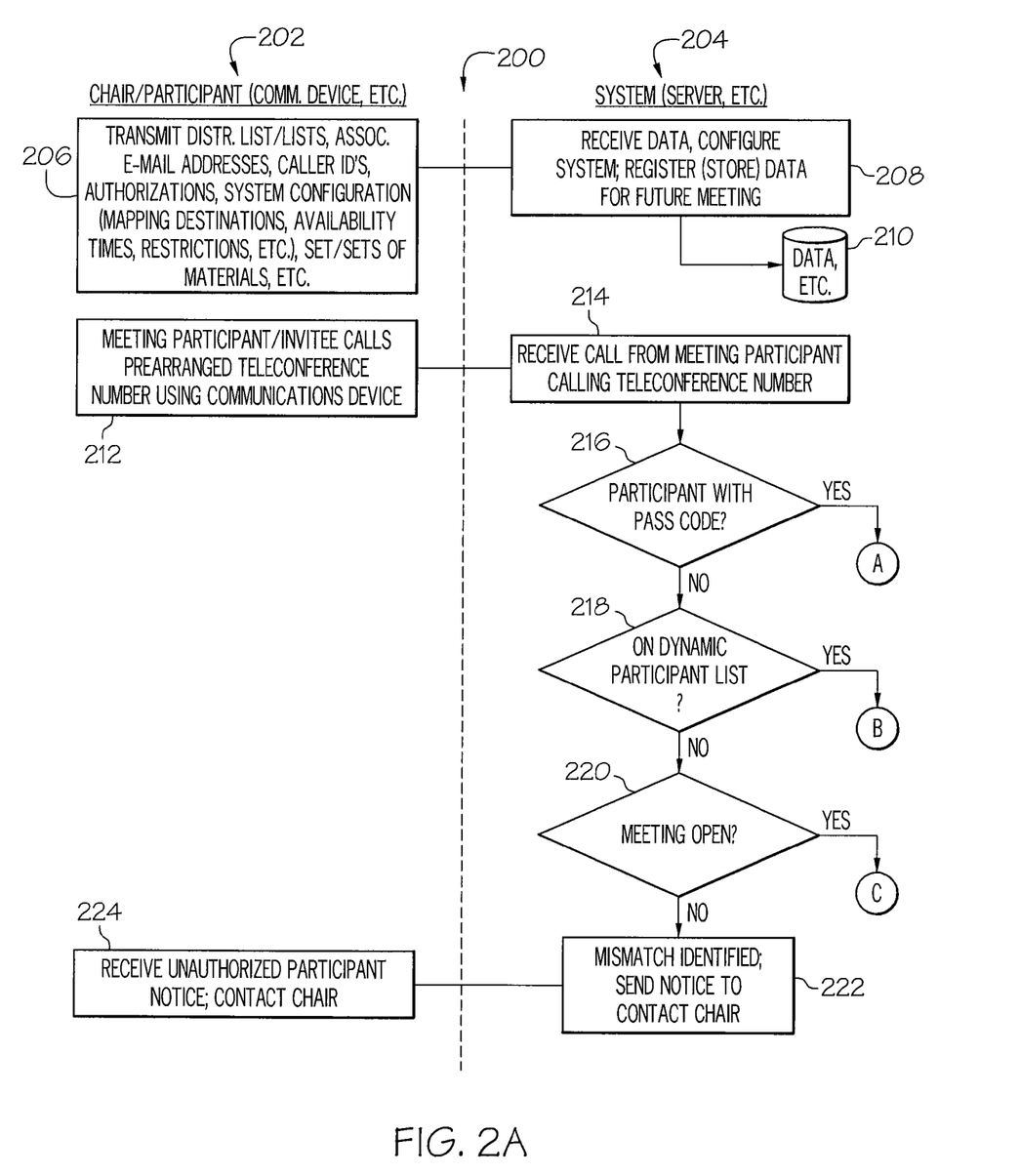
FIGS. 2A and 2B (collectively FIG. 2) is a flow chart of an example of a method for accessing materials in accordance with another embodiment of the present invention.
Figure 2B:
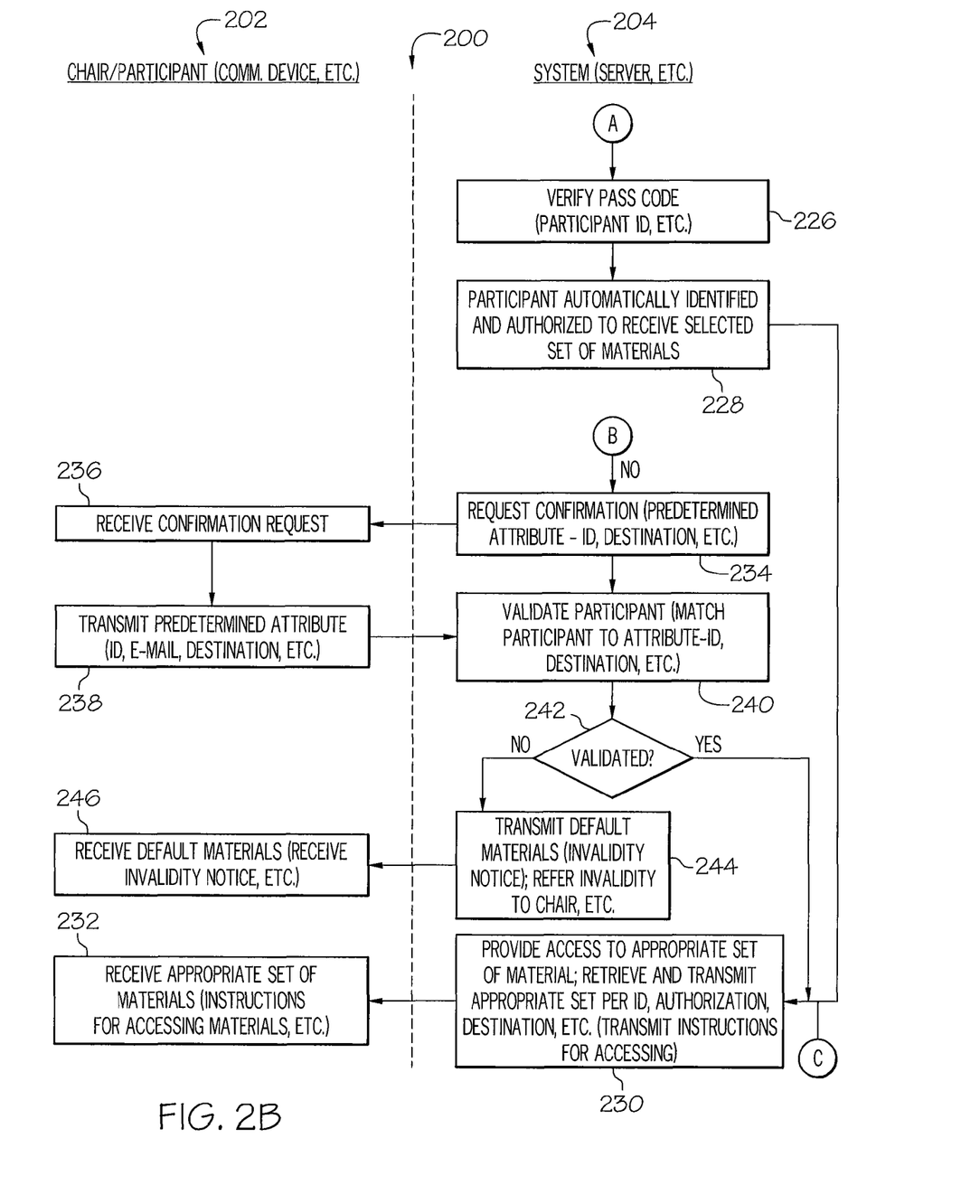

FIGS. 2A and 2B (collectively FIG. 2) is a flow chart of an example of a method 200 for accessing materials in accordance with another embodiment of the present invention. The method 200 may include operations or functions that may be performed by a chair's or meeting participant's communications device 202 and functions that may be performed by a meeting or teleconference system or server 204. In block 206, a distribution list or lists may be transmitted to the system or server 204 along with any system configurations and set or sets of materials similar to that previously described. Each meeting participant in the distribution list or lists may include an associated email address, caller ID, authorizations for access to materials or similar information related to each meeting participant.

In block 208, the system or server 204 may receive the data including the distribution list, sets of materials and any system configuration. The system 204 may be configured based on any system configurations similar to that previously described and the data may be registered or stored for a future meeting in a database 210.

In block 212, a meeting participant 202 or invitee may call a prearranged teleconference number using a communications device. In block 214, the system or server 204 may receive the call from the meeting participant 202.

In block 216, a determination may be made whether the participant 202 provided a pass code to the meeting system or server 204. If no pass code was provided, the method 200 may advance to block 218. In block 218, a determination may be made whether the participant is on a dynamic participant list. If the participant is not on a dynamic participant list in block 218, the method 200 may advance to block 220 and a determination may be made as to whether the meeting is an open meeting. If the meeting is not an open meeting in block 220, the method 200 may advance to block 222. In block 222, a mismatch is identified between the meeting participant and data stored by the system or server 204. A notice is sent to the meeting chair and/or a notice is sent to the caller or would-be meeting participant advising the caller to contact the meeting chair. In block 224, the caller receives the unauthorized participant notice. Alternatively, or in addition, the meeting chair may also receive notice of an unauthorized caller trying to gain access to the meeting or teleconference.

Returning to block 216, if the participant or caller has a pass code or enters a pass code when calling the system or server 204, the method 200 may advance to block 226 (FIG. 2B). In block 226, the pass code may be verified. The pass code may be the participant's caller ID or some other identification or authorization.

In block 228, the participant may be automatically identified and authorized to receive a selected set of materials based on a predetermined criteria or attribute associated with the meeting participant, similar to that previously described. The method 200 may then advance to block 230. In block 230, access to the appropriate set of material may be provided to the meeting participant. In another embodiment, the appropriate set of materials based on the predetermined attribute associated with the meeting participant may be retrieved and transmitted to the meeting participant. Examples of the predetermined attribute may be an identification of the participant, an authorization of the participant, a destination where the materials are to be sent or similar attribute. In another embodiment, instructions may be transmitted to the meeting participant for accessing the appropriate materials or set of materials.

In block 232, the meeting participant may receive the appropriate set of materials or instructions for accessing the materials.

Returning to block 218 in FIG. 2A, if the meeting participant is on the dynamic participant list, the method 200 may advance to block 234 in FIG. 2B. In block 234, the meeting system or server 204 may send a request confirmation to the meeting participant 202. The request confirmation may require that the meeting participant provide the predetermined attribute, such as the participant's ID, authorization, destination for sending the materials, or some other attribute associated with the meeting participant and that can be used to validate the participant as an invitee or authorized participant in the meeting and determine the appropriate set of materials for sending to the meeting participant 202 or for allowing access to the materials by the meeting participant 202.

In block 238, the predetermined attribute may be transmitted to the meeting system or server 204. In block 240, the participant may be validated. The participant may be validated by matching the participant's attribute to an attribute previously provided to the system 204 by the meeting chair 202 and stored by the system in block 208. Similar to that previously discussed, the system 204 may match at least one of a stored email address, a caller ID or some other attribute associated with the meeting participant to validate participation in the meeting.

In block 242, a determination may be made as to whether the participant has been validated. If the participant is determined to be a valid participant in 242 the method 200 may advance to block 230 and the method 200 may proceed similar to that previously described. If the participant is not validated in block 242, the method 200 may advance to block 244. In block 244, a default set of materials may be transmitted to the meeting participant 202. In another embodiment, a notice may be sent to the meeting participant that he is not a valid participant and may refer the intended participant to the meeting chair. An invalidity notice may also be sent to the meeting chair in block 244.

In block 246, the would-be participant may receive the default materials and/or notice of the inability to confirm the participant as a valid participant in the meeting. The meeting chair may also receive a notice of the failure to validate the meeting participant or would-be participant.

If the participant is validated in block 242, the method 200 may advance to block 230 and the method 200 may proceed similar to that previously described with reference to blocks 230 and 232.

Returning to block 220 in FIG. 2A, if the meeting is an open meeting in block 220, the method 200 may advance to block 230 and the method may advance similar to that previously described with reference to blocks 230 and 232.

Figure 3:
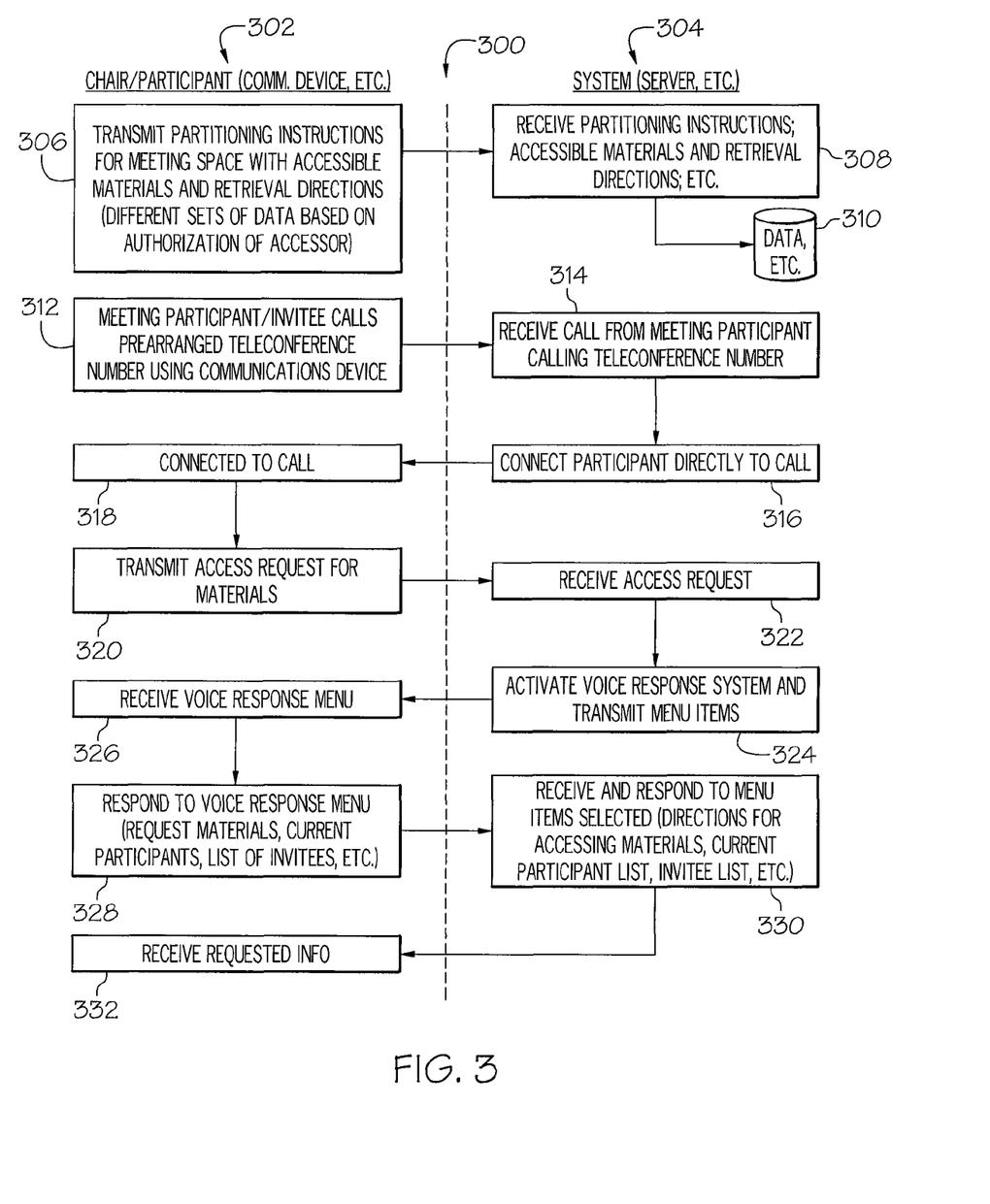
FIG. 3 is a flow chart of an example of a method for accessing materials in accordance with a further embodiment of the present invention.

FIG. 3 is a flow chart of an example of a method 300 for accessing materials in accordance with a further embodiment of the present invention. The method 300 may include operations or functions that may be performed by a communications device 302 of a participant or meeting chair and system operations or functions that may be performed by a meeting system or server 304. In block 306, partitioning instructions for meeting space with accessible materials and directions for retrieving the materials may be transmitted to the system or server 304. Similar to that previously described, different sets of data based on authorization of the meeting participant or invitee may be designated. In block 308, the partitioning instructions, accessible materials and retrieval directions may be received by the system and stored in a database 310 for a future meeting.

In block 312, a meeting participant 302 or invitee may call a prearranged conference number using a telecommunications device. In block 314, the call from the meeting participant 302 may be received by the system or server 304. In block 316, the participant may be directly connected to the conference call or meeting. In block 318, the meeting participant 302 is connected to the call.

In block 320, the meeting participant 302 may transmit a request for access to the appropriate materials. The request for access may be initiated by a predetermined action by the meeting participant 302 or user using his communications device. For example, the meeting participant 302 or user may operate a predetermined button on his communications device or by some other means. In block 322, the access request may be received by the system or server 304. In block 324, a voice response system or voice response menu or similar mechanism may be activated and the menu items may be transmitted to the communications device of the meeting participant 302.

In block 326, the meeting participant 302 may receive the voice response menu. In block 328, the meeting participant may respond to the voice response menu. The voice response menu may include a feature for requesting the appropriate materials for the meeting participant. The voice response menu may also include other options or features which may be selected by the meeting participant 302. For example, the voice response menu may include directions for accessing the materials, a list of participants currently participating in the meeting or call, a list of participants not currently participating in the meeting, a list of invitees to the meeting, or other information related to the meeting and its participants or invitees.

In block 330, the system or server 304 may receive the response from the meeting participant 302 and transmit the requested information. In block 332, the requested information may be received by the meeting participant 302. Accordingly, the method 300 may provide an extension of a voice response help menu or the like to provide materials for a meeting or teleconference on the call after the meeting participant has already dialed in or has dialed in late for the meeting or teleconference. After joining the conference, the meeting participant can invoke the voice menu again through an appropriate means and request the appropriate set of materials at that time. The meeting participant may invoke the voice menu by operating a predetermined key on the meeting participant's communications device or by some other means commonly used to access a menu in communications devices. Even if the feature for accessing the meeting materials is skipped upon entering the conference call, the meeting participant can still return to the menu to retrieve the appropriate materials. A voice prompt as in block 324 can provide instructions for accessing the presentation materials. The meeting participant or invitee can then follow the instructions to link or access the materials.

As described above, the voice response system may also provide additional information. Examples of additional information may include who was invited to participate in the meeting or teleconference; who is currently on the call; who has not yet entered the call; and similar information related to the conference call or meeting. The information or data may be provided either by the voice response system or by visual data sent to the meeting participant's communications device. Accordingly, the method 300 provides a mechanism for providing materials for the meeting when needed during the duration of the meeting. Provides a mechanism for obtaining the presentation materials when the attendee or meeting participant was not on the meeting chairman's original distribution list. May provide a means for obtaining the presentation materials when the meeting participant is away from his primary work location and provides a means for obtaining additional materials which become available during the meeting time.

Figure 4:
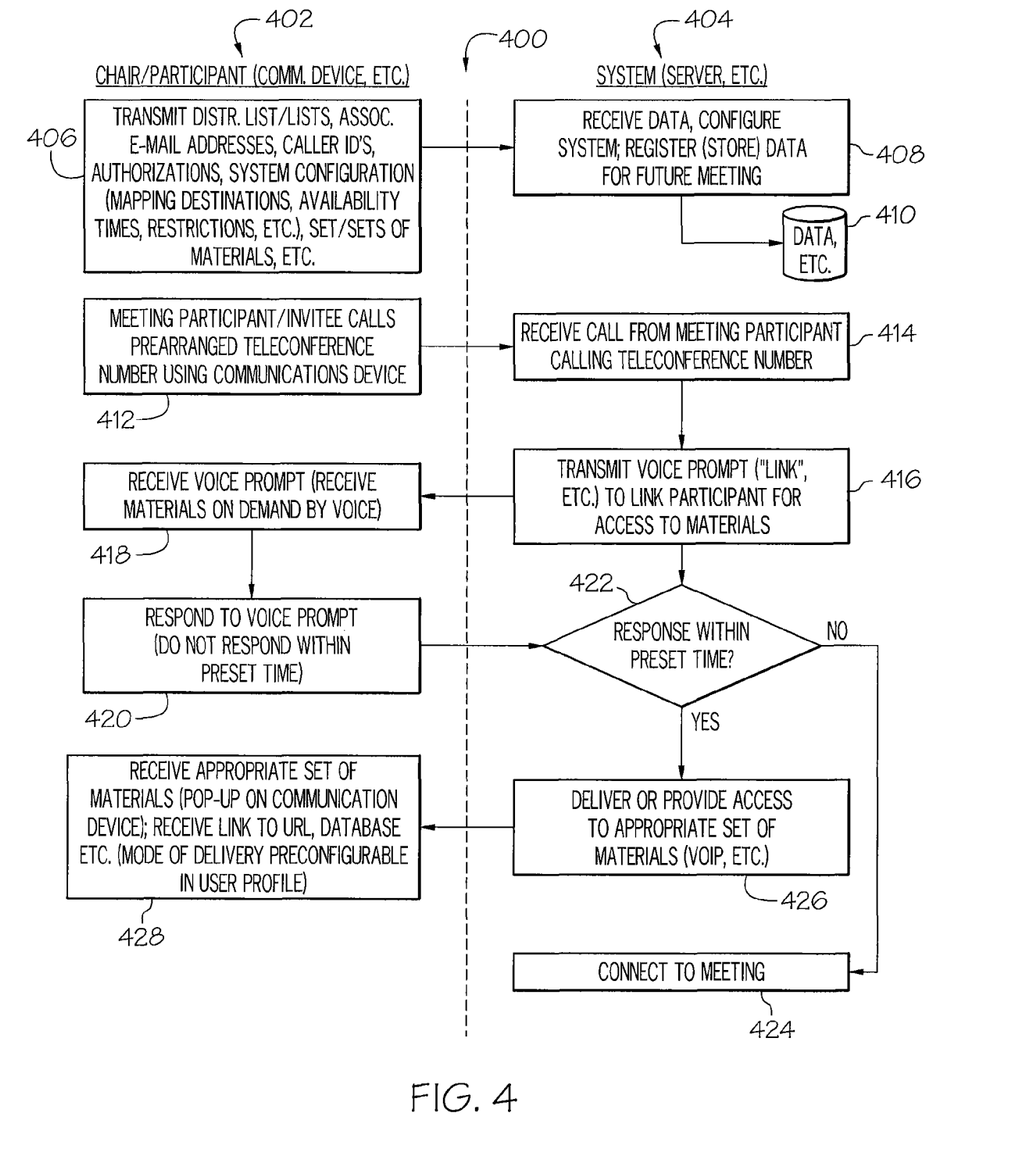
FIG. 4 is a flow chart of an example of a method for accessing materials in accordance with another embodiment of the present invention.

FIG. 4 is a flow chart of an example of a method 400 for accessing materials in accordance with another embodiment of the present invention. The method 400 may include operations or functions that may be performed by a communications device 402 of a meeting chair or meeting participant and operations or functions that may be performed by a meeting or teleconference system or server 404. In block 406, a distribution list or lists may be transmitted to the system or server 404. Similar to that previously described, the distribution list may include an email address, caller ID, authorizations or other information related to each meeting participant 402 or invitee in the distribution list or lists. Also in block 406, any system configurations by the meeting chair may also be transmitted to the meeting system or server 404. System configurations may include mapping of destinations for transmitting meeting or presentation materials to each of the meeting participants, available times for accessing meeting materials, any restrictions on accessing the meeting materials or other system configurations. In block 406, a set or sets of materials may also be transmitted to the system or server 404. Similar to that previously described, different sets of materials may be associated or designated for different distribution lists of meeting participants based on a selected criteria or predetermined attributes.

In block 408, the system or server 404 may receive the data or information transmitted in blocks 406. The system 404 may be configured according to any system configurations specified by the meeting chair. The distribution list or lists and set or sets of materials may be stored in a database 410 or other storage device.

In block 412, a meeting participant or invitee may call a prearranged teleconference number using the participant's communications device 402. In block 414, the call is received by the system or server 404. In block 416, a voice prompt may be transmitted to the meeting participant 402 or invitee. The voice prompt may be a term, such as "Link" or similar expression to indicate to the meeting participant 402 or invitee that a link may be provided and may be accessed for accessing the appropriate materials for the meeting participant.

In block 418, the participant or participant's communications device 402 receives the voice prompt permitting the meeting participant 402 to receive the materials on demand by voice. In block 420, the meeting participant may transmit via his communications device 402 a response to the voice prompt.

In block 422, a determination may be made whether a response was received from the meeting participant within a preset time. If the voice response was not received from the meeting participant within the preset time, the method 400 may advance to block 424 and the meeting participant or invitee may be connected directly to the meeting or teleconference. If the voice response was received within the preset time, the method 400 may advance to block 426. In block 426, the appropriate set of materials may be delivered to the meeting participant or the meeting participant's communications device 402 or instructions for accessing the appropriate set of materials may be provided to the meeting participant or meeting participant's communications device 402.

In block 428, the meeting participant may receive the appropriate set of materials or a link for accessing the appropriate set of materials. For example, a pop-up on the meeting participant's communications device 402 may permit the meeting participant to open the materials. In another embodiment of the present invention. The appropriate set of materials may be delivered via a mode of delivery pre-configurable in a user profile of the meeting participant.

The method 400 may be embodied in an integrated voice and data system similar to that described with reference to FIG. 5 to enable quick and direct access to the appropriate set of materials. As previously described, when a meeting participant calls the prearranged teleconference number, a voice prompt from the system or server 404 may express a term such as "linked" for accessing the materials. A voice over IP (VoIP) client such as a shared Skype voice over IP client may be started in response to the meeting participant responding to the voice prompt from the system 404. The meeting system or server 404 may provide the option at call-in time based on voice recognition or other means and deliver the materials or information for accessing the materials from VoIP, over a data channel with linkages to the appropriate set of materials using channels client to client. As previously discussed, a pop-up on the meeting participant's desktop or communications device may be provided to open the materials automatically from the Skype or VoIP client without user interaction or provide the appropriate URL or database link to the appropriate set of materials. These options can be configured in a user profile to indicate the meeting participant's desired preferences of whether to open the presentation materials by default. Accordingly, meeting attendees or participants may use a VoIP client to access the conference call and meeting materials may be requested on demand by voice, a menu or dual tone multi-frequency (DTMF) actions directly to the meeting participant's desktop. User profiles can result in prompting the user for accessing the materials or automatically opening the presentation materials on the user's communications device similar to that previously described.

Figure 5:
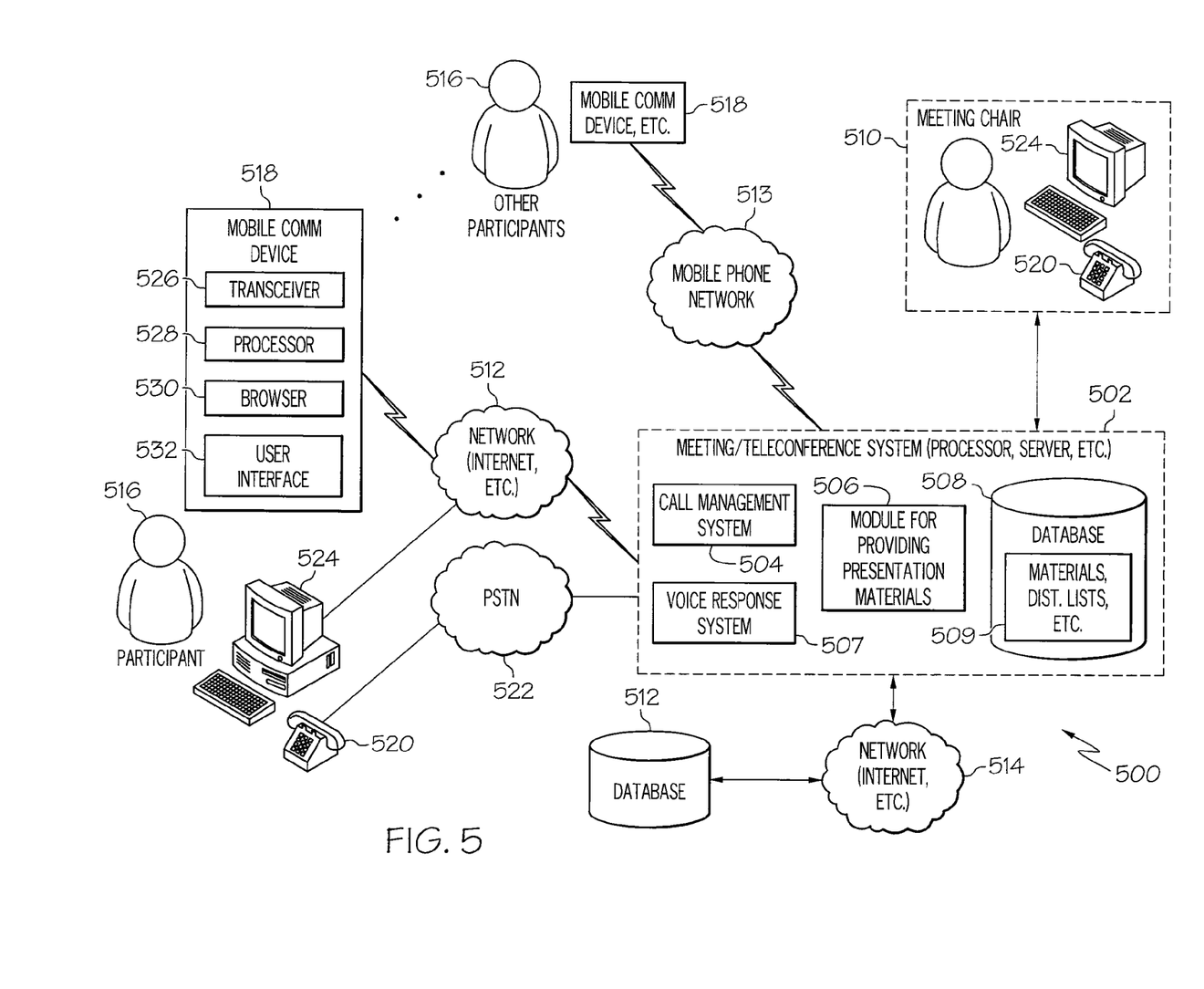
FIG. 5 is a block schematic diagram of an example of a system for accessing materials in accordance with an embodiment of the present invention.

FIG. 5 is a block schematic diagram of an example of a system 500 for accessing materials in accordance with an embodiment of the present invention. Elements or portions of the methods 100, 200, 300 or 400 may be embodied in and performed by components of the system 500. The system 500 may include a meeting or teleconference system 502. The functions or operations performable by the system or servers in FIGS. 1-4 may be embodied in, stored in and performed by the teleconference system 502. The teleconference system 502 may be embodied in a processor, server or other device capable of performing the operations described herein.

The teleconference system 502 may include a call management system 504 to manage interconnection of the communications between the different participants on the teleconference. The teleconference system 502 may also include a module 506 for maintaining and providing the presentation materials to the participants or invitees similar to that described herein. The teleconference system 502 may also include a voice response system 507 or voice response menu for performing the operations described herein.

A database 508 may also be associated with the teleconference system 502. The database 508 may store the presentation materials 509, distribution list or lists and other information or data as described herein. The database 508 may store presentation materials or sets of presentation materials for multiple different teleconferences that may be occurring simultaneously or that are scheduled for a future date. The database 508 may also store presentation materials 509 for a period of time after the teleconference depending upon the desires of a teleconference chair 510 or organizer or retention options selected.

In another embodiment of the present invention, another database 512 for storing presentation materials, distribution lists of meeting participants or attendees and other information may be accessed via a network 514 by the teleconference system 502. The database 512 may be in addition to the database 508 or may be an alternative to the database 508 of the teleconference system 502.

The meeting chair 510 or organizer may access the teleconference system 502 to schedule the teleconference and to post the presentation materials 509.

As previously discussed, a meeting participant 516 may call a prearranged teleconference number using a communications device. The communications device may be a mobile communications device 518 similar to that previously described or some other type of communications device. For example, the communications device may also be a standard landline telephone 520 connectable to the teleconference via a public switched telephone network (PSTN) 522, and the participant 516 may access the presentation materials via a desk top computer 524 or other computing device.

The exemplary mobile communications device 518 may include a transceiver 526 for sending and receiving voice communications and data including the presentation materials. The mobile communications device 518 may include a processor 528 to control operation of the communications device and to perform the operations described herein. A browser 530 may be included to facilitate accessing the presentation materials via a network 512, such as the Internet, mobile phone network 513, or both or some other wireless communications network. The mobile communications device 518 may further include a user interface 532 for the participant 516 to control operation of the communications device 518, for participating in the teleconference and for accessing the presentation materials. The user interface 532 may include a display screen, keypad or keyboard, microphone, and speaker for voice and audio communications. The wireless communications device 518 may access the meeting or teleconference system or server 502 using Wireless Application Protocol (WAP) or other technology to access the system via the Internet or other network. As previously described, the communications devices 518 may utilize VoIP for similar technology for integrated voice and data access to the meeting or teleconference system or server 502 for accessing the materials and actual voice participation in the meeting or teleconference.

The flowcharts and block diagrams in FIGS. 1 and 2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method for accessing materials for a meeting, comprising:

storing, by the processor, at least one of an email address and a caller ID in association with each meeting participant;

storing, by the processor, a plurality of distribution lists of meeting participants in the database;

storing, by the processor, a plurality of different sets of materials for the meeting in the database;

associating, by the processor, each different set of materials with a different distribution list of meeting participants based on a selected criteria;

allowing, by the processor, a meeting chair to define days and times when each of the plurality of different sets of materials may be available;

receiving, by a processor, a call from a meeting participant by a system, wherein the meeting participant calls a prearranged teleconference number to participate in the meeting;

automatically confirming, by the processor, the meeting participant as authorized for participation in the meeting, wherein automatically confirming the meeting participant comprises matching the meeting participant to at least one of an email address or a caller ID previously stored by the system in association with the meeting participant to validate participation of the meeting participant;

transmitting a request to the meeting participant to provide a predetermined attribute to confirm the meeting participant as authorized for participation in the meeting in response to not automatically confirming the meeting participant;

validating the meeting participant, by the processor, based on the predetermined attribute;

providing, by the processor, access to an appropriate set of materials to the meeting participant based on the meeting participant being validated and the predetermined attribute associated with the meeting participant; and providing access to a default set of materials in response to the meeting participant not being a validated meeting participant.

2. The computer implemented method of claim 1, further comprising storing a set of materials for access by each meeting participant.

3. The computer implemented method of claim 1, wherein providing access to an appropriate set of materials comprises providing access to the set of materials associated with the distribution list in which the meeting participant is listed.

4. The computer implemented method of claim 1, further comprising:

matching the meeting participant to a predetermined attribute of the meeting participant; and sending the appropriate set of materials to the meeting participant in response to validating participation of the meeting participant in the meeting based on the predetermined criteria.

5. The computer implemented method of claim 1, further comprising requesting the meeting participant to identify himself and to confirm a destination for delivery of the appropriate set of materials.

6. The computer implemented method of claim 5, further comprising:

receiving at least one of an email address and a caller ID from the meeting participant in response to requesting the meeting participant to identify himself and to confirm a destination for delivery of the appropriate set of materials; and transmitting the appropriate set of materials to the meeting participant based on one of the email address and the caller ID of the meeting participant and based on a distribution list containing the meeting participant.

7. The computer implemented method of claim 1, further comprising restricting at least one of a location where the appropriate set of materials are able to be sent, a time when the appropriate set of materials are able to be sent or accessed, and a medium by which the appropriate set of materials are able to be sent.

8. The computer implemented method of claim 1, further comprising providing a notice of an invalid meeting participant to a meeting chair.

9. The computer implemented method of claim 1, further comprising:

transmitting a voice prompt to the meeting participant for the meeting participant to select to link to the appropriate set of materials; and providing access to the appropriate set of materials in response to the meeting participant responding to the voice prompt within a preset time period.

10. The computer implemented method of claim 9, wherein providing access to the appropriate set of materials comprises one of providing a pop-up on the meeting participants communications device for accessing the appropriate set of materials and providing a URL or database link to the appropriate set of materials.

11. The computer implemented method of claim 1, further comprising providing a voice response menu for providing access to the appropriate set of materials.

12. The computer implemented method of claim 1, further comprising connecting the meeting participant to a voice response menu for accessing the appropriate set of materials and other information related to the meeting in response to a predetermined action by the meeting participant after the meeting participant has been connected to the meeting, wherein the other information related to the meeting comprises directions for accessing the materials, a list of participants currently participating in the meeting, a list of participants not currently participating in the meeting, and a list of invitees to the meeting.

13. A system for accessing materials for a meeting, comprising:

a processor, wherein the processor is adapted to:

store at least one of an email address and a caller ID in association with each meeting participant;

store a plurality of distribution lists of meeting participants in the database;

store a plurality of different sets of materials for the meeting in the database;

associate each different set of materials with a different distribution list of meeting participants based on a selected criteria; and allow a meeting chair to define days and times when each of the plurality of different sets of materials may be available;

a system associated with the processor for receiving a call from a meeting participant, wherein the meeting participant calls a prearranged teleconference number to participate in the meeting;

a module operable on the processor for automatically confirming the meeting participant as authorized for participation in the meeting, wherein automatically confirming the meeting participant comprises matching the meeting participant to at least one of an email address or a caller ID previously stored by the system in association with the meeting participant to validate participation of the meeting participant;

a module operable on the processor for transmitting a request to the meeting participant to provide a predetermined attribute to confirm the meeting participant as authorized for participation in the meeting in response to not automatically confirming the meeting participant;

a module operable on the processor for validating the meeting participant based on the predetermined attribute;

a module operable on the processor for providing access to an appropriate set of materials to the meeting participant based on the meeting participant being validated and the predetermined attribute associated with the meeting participant; and a module operable on the processor for providing access to a default set of materials in response to the meeting participant not being a validated meeting participant.

14. The system of claim 13, wherein the database comprises at least one distribution list of meeting participants and at least one of an email address and a caller ID in association with each meeting participant.

15. The system of claim 13, wherein the database comprises a plurality of distribution lists of meeting participants, and a plurality of different sets of materials for the meeting, wherein each different set of materials is associated with a different list of meeting participants based on a selected criteria.

16. The system of claim 13, further comprising a voice response system for providing access to the appropriate set of materials and other information, wherein the other information comprises directions for accessing the materials, a list of participants currently participating in the meeting, a list of participants not currently participating in the meeting, and a list of invitees to the meeting.

17. A computer program product for accessing materials for a meeting, the computer program product being executable by a processor, the computer program product comprising:
   computer readable program code configured to store at least one of an email address and a caller ID in association with each meeting participant;
   computer readable program code configured to store a plurality of distribution lists of meeting participants in the database;
   computer readable program code configured to store a plurality of different sets of materials for the meeting in the database;
   computer readable program code configured to associate each different set of materials with a different distribution list of meeting participants based on a selected criteria;
   computer readable program code configured to allow a meeting chair to define days and times when each of the plurality of different sets of materials may be available;
   a computer useable storage device having computer useable program code embodied therein, the computer useable program code comprising:
   computer usable program code configured to receive a call from a meeting participant by a system, wherein the meeting participant calls a prearranged teleconference number to participate in the meeting;
   computer usable program code configured to automatically confirm the meeting participant as authorized for participation in the meeting, wherein automatically confirming the meeting participant comprises matching the meeting participant to at least one of an email address or a caller ID previously stored by the system in association with the meeting participant to validate participation of the meeting participant;
   computer usable program code configures to transmit a request to the meeting participant to provide a predetermined attribute to confirm the meeting participant as authorized for participation in the meeting in response to not automatically confirming the meeting participant;
   computer usable program code configured to validate the meeting participant based on the predetermined attribute;
   computer usable program code configured to provide access to an appropriate set of materials to the meeting participant based on the meeting participant being validated and the predetermined attribute associated with the meeting participant; and
   computer usable program code configured to provide access to a default set of materials in response to the meeting participant not being a validated meeting participant.

* * * * *